Figure 1:
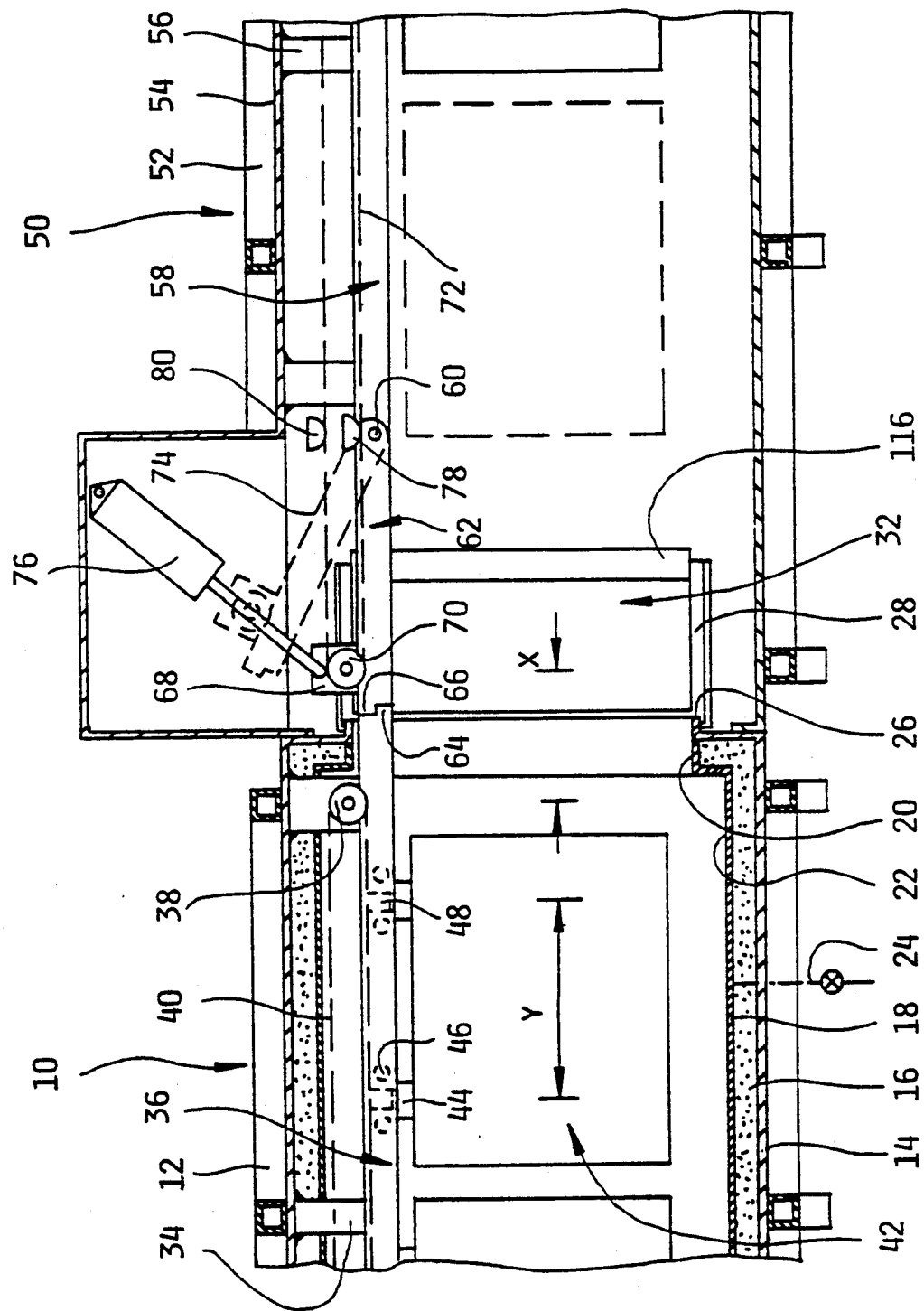

United States Patent [19]
Fessmann

[11] Patent Number: 5,255,596
[45] Date of Patent: Oct. 26, 1993

[54] SYSTEM FOR PROCESSING PRODUCTS, IN PARTICULAR FOOD

[75] Inventor: Klaus-Dieter Fessmann, Winnenden, Fed. Rep. of Germany

[73] Assignee: Germos-Fessmann GmbH & Co KG, Remshalden-Grunbach, Fed. Rep. of Germany

[21] Appl. No.: 809,500

[22] PCT Filed: May 23, 1990

[86] PCT No.: PCT/EP90/00833
  § 371 Date: Jan. 21, 1992
  § 102(e) Date: Jan. 21, 1992

[87] PCT Pub. No.: WO91/17662
  PCT Pub. Date: Nov. 28, 1991

[51] Int. Cl.$^5$ ............................................. A23B 4/044
[52] U.S. Cl. ................................. 99/477; 99/443 C; 99/478; 99/479
[58] Field of Search .......... 99/477, 478, 479, 443 C; 198/950, 666, 672; 104/130, 131; 49/367, 368

[56] References Cited

U.S. PATENT DOCUMENTS

| | | | |
|---|---|---|---|
| 1,524,533 | 1/1925 | Brand | 99/479 |
| 1,534,867 | 4/1925 | Peschke et al. | 99/477 |
| 1,704,650 | 3/1929 | Brand . | |
| 1,746,917 | 2/1930 | Tobin | 49/367 |
| 2,505,673 | 5/1950 | Julian . | |
| 3,252,200 | 5/1966 | Gulde . | |
| 3,318,261 | 5/1967 | Garcia et al. | 104/131 |
| 3,371,445 | 3/1968 | Herr et al. | 49/368 |
| 3,697,725 | 10/1972 | Bielefeldt | 99/443 C |
| 3,770,148 | 11/1973 | Hendren . | |
| 3,802,832 | 4/1974 | Nicolaus | 99/443 C |
| 3,935,821 | 2/1976 | Maler et al. | 104/131 |
| 4,729,470 | 3/1988 | Bacigalupe et al. | 99/479 |
| 5,109,758 | 5/1992 | Voegtlin | 99/479 |

FOREIGN PATENT DOCUMENTS

| | | | |
|---|---|---|---|
| 1017896 | 10/1957 | Fed. Rep. of Germany | 99/477 |
| 0049387 | 8/1966 | Fed. Rep. of Germany | 99/479 |
| 1090782 | 4/1955 | France | 49/367 |

Primary Examiner—Harvey C. Hornsby
Assistant Examiner—James F. Hook
Attorney, Agent, or Firm—Lowe, Price, LeBlanc & Becker

[57] ABSTRACT

A system for processing products, particularly food, has a treatment chamber (10) which is closed by a door (30, 32) in leak proof manner, so that product carriers (42) can be moved through the treatment chamber (10) by trolleys (44) suspended from a conveyor rail (36, 58, 62), and the conveyor rail comprises a pivotable rail section (62) arranged outside of the treatment chamber and which is movable into a park position (74), wherein the door (30, 32) of the treatment chamber can be closed.

8 Claims, 4 Drawing Sheets

SYSTEM FOR PROCESSING PRODUCTS, IN PARTICULAR FOOD

The invention relates to a system for processing products, particularly food.

Typical examples for such system are smoke systems for processing meat and sausages as well as other food like cheese, the processing temperature being up to about 70° C. The process smoke is produced by known industrial methods, e.g. by using super heated water steam, by carbonising at low temperatures or by dry destillation. A smoke system can comprise one or a plurality of successive treatment chambers. The doors of such a smoke system must close in tight manner, this requirement concerning the charging door as well as the discharging door providing access to a succeeding treatment chamber. A tightly closing door system warrants that a different climate can be adjusted in the different treatment chambers. Furthermore tightness of the treatment chambers is necessary to avoid annoyance caused by smell of the process smoke and to effectively cope with emissions.

Tight closing of the doors is warranted, if the doors are moved towards and onto a stationary sealing edge such that the closing movement has a component being perpendicular to the plane of the doorway, the stationary sealing edge cooperating with an elastic sealing gasket provided at the periphery of the door. Such a sealing arrangement implies that there is a threshold projecting over the surface of the floor adjacent to the lower end of the door. In view of retaining condensate and in view of troublefree cleaning of the interior of the the treatment chamber it is also desirable, if the floor of the treatment chamber in the vicinity of the door is not level with the floor of the surrounding hall but cooperates with the threshold of the door to form a trough.

In the known processing systems product carriers are used having wheels running on the floor of the treatment chamber. These product carriers are intermittently moved through the various positions of the treatment chamber using e.g. hydraulic actuators of important stroke. If such product carriers running on wheels are used, obviously one cannot provide a threshold at the door of the treatment chamber as would be desirable in view of good sealing properties of the door and in view of forming the lower portion of the treatment chamber as a trough, as has been pointed out above.

The object of the present invention is thus to improve a processing system in accordance with the preamble of claim 1 in such manner that automatic charging and discharging of the treatment chambers can be achieved, simultaneously warranting tight closing properties of the door and retaining of liquid, that may have accumulated on the floor of the treatment chamber.

In accordance with the present invention this object is achieved by a processing system as described hereafter.

In the processing system in accordance with the present invention the product carriers run on a rail. Thus a lower threshold can be easily provided at the doors of the treatment chamber as is desirable in view of good sealing properties and in view of forming a trough. In order to allow opening and closing of the doors a section of the rail is apt to be moved out of the basic configuration of the rail thus providing a respective gap allowing movement of the doors.

Advantageous further improvements of the invention are given in the subclaims.

The further improvement of the invention in accordance with another embodiment is advantageous in that the drive used for moving the movable rail section need not take up the weight of product carriers moved across the movable rail section. Furthermore taking up of the load by the stationary end of the rail is effected in a safe manner and without creation of major bending moments.

Often the conveyor rails of power and free conveyors are formed as hollow rails, e.g. twin C rails, being open at the lower face thereof and receiving the load carrying rollers and guiding rollers of the trolleys of the product carriers. The further improvement of the invention in accordance with another embodiment is advantageous in that perfect sealing of the treatment chambers at the doors thereof is also warranted in the case of hollow rails.

Pivotable doors having two wings are of particular interest for closing a treatment chamber in view of compact geometry. If segmenting of the door is effected in asymmetric manner in accordance with another embodiment, there is a straight sealing line between the two wings of the door, since the sealing line does not extend through the recess of the door receiving the support section of the rail.

In accordance with the further improvement of the invention in accordance with another embodiment there is a troublefree transfer of a product carrier between a first flexible conveyor associated to the treatment chamber and a second flexible conveyor used for charging and/or discharging of the treatment chamber through the door thereof, the arrangement also allowing use of trolleys of the product carriers being of short dimension as seen in the conveying direction. Such short trolleys make it possible to move product carriers also having small dimension as seen in the conveying direction through a treatment chamber under small relative spacing.

In such a system the improvement of another embodiment has the further advantage that there is no need for a continuously operating elastic tensioning unit associated to the second flexible conveying means, which in turn is associated to the pivotable rail section, since pivoting of the movable rail section will not modify the overall path or length of the conveying means.

In a further improved conveying system in accordance with another embodiment there is a troublefree transfer of a product carrier from the first conveying means to the second conveying means.

Figure 2:
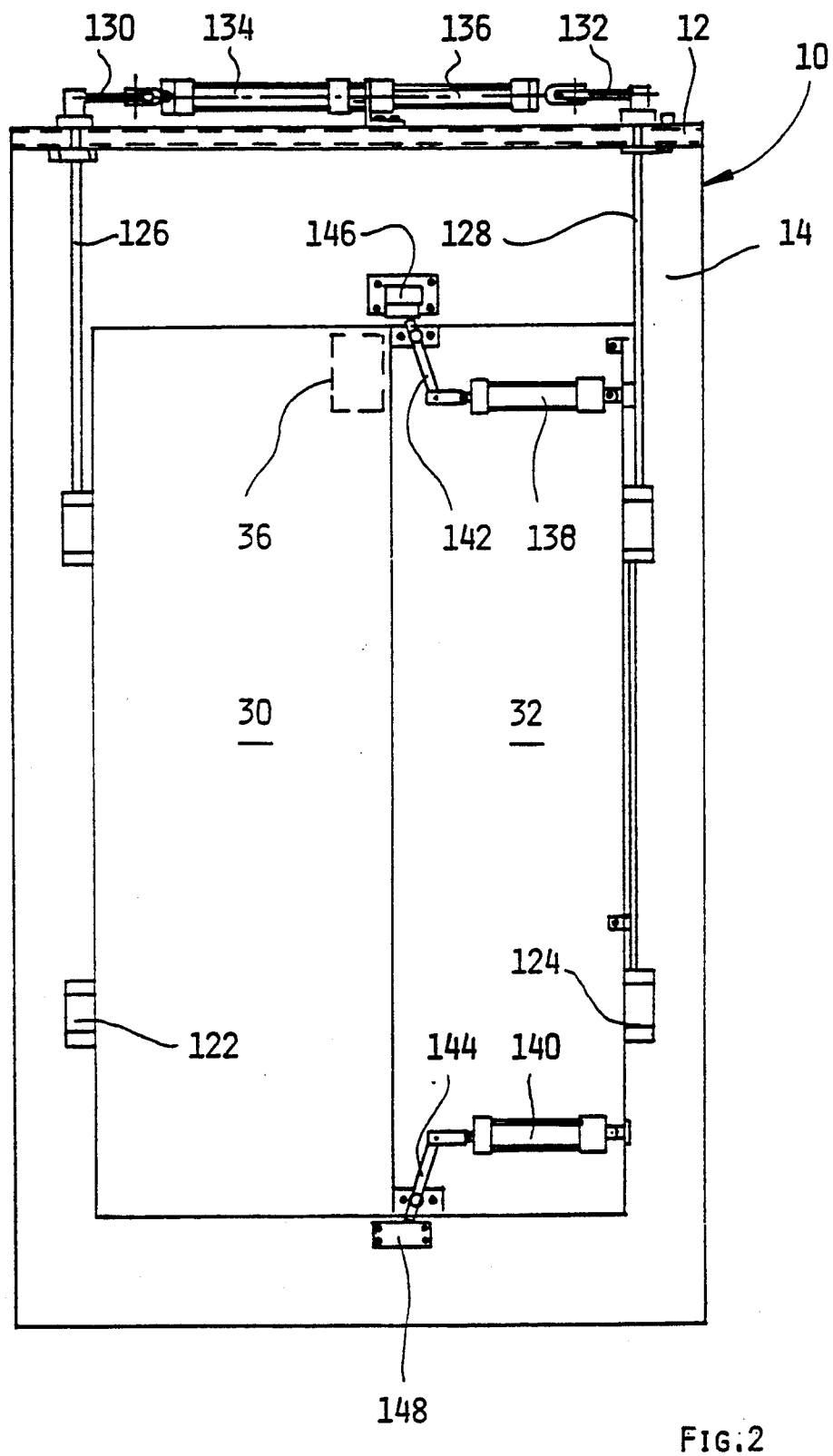
Figure 3:
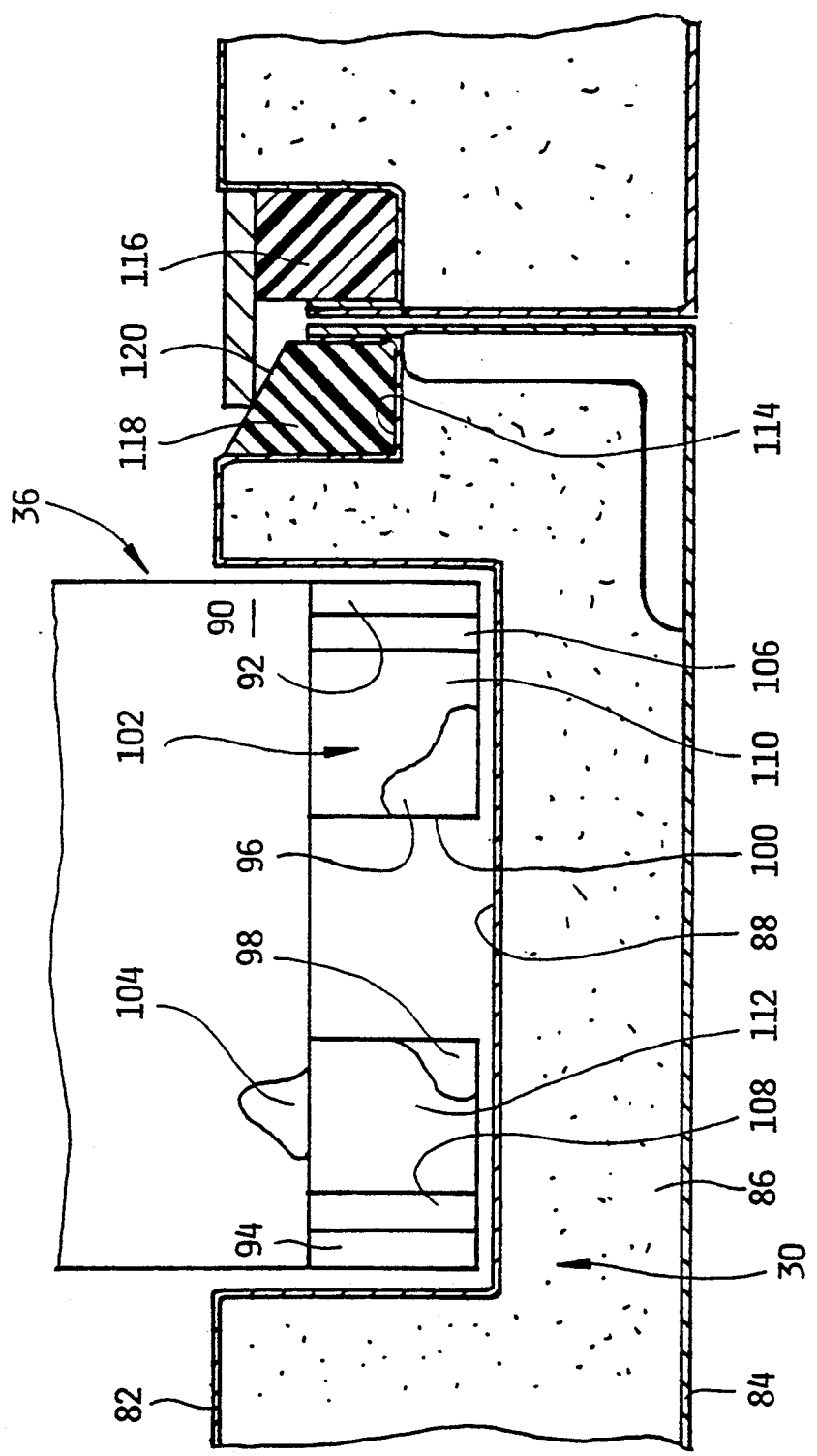
Figure 4:
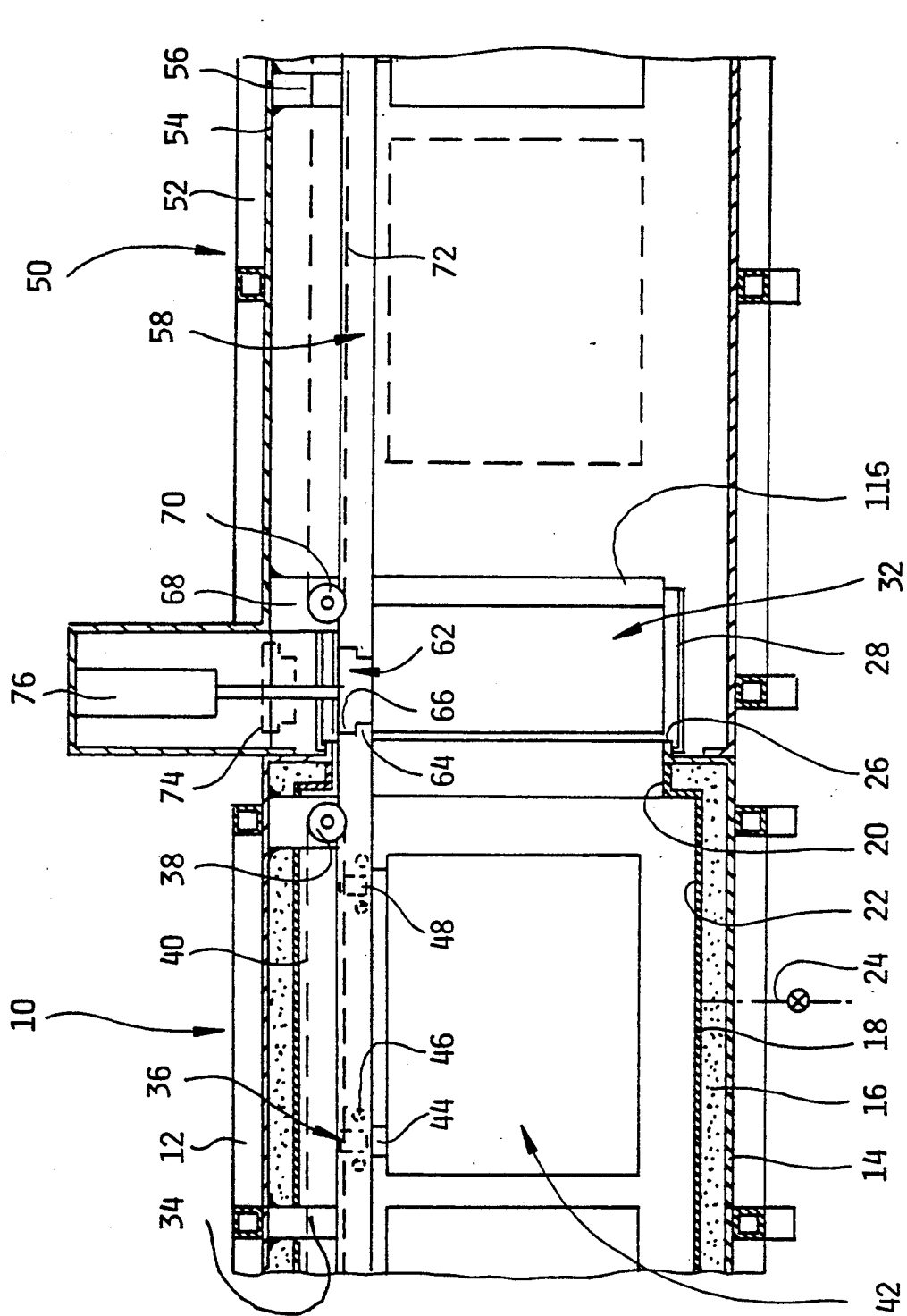

Preferred embodiments of the invention will now be explained referring to the drawings. Therein:

FIG. 1: is a vertical longitudinal section through that region of a smoke processing system for meat products, where a smoke treatment chamber and a succeeding cooling chamber adjoin;

FIG. 2: is a top view of the exterior of a practical embodiment of an intermediate door separating the smoke treatment chamber and the cooling chamber;

FIG. 3: is a horizontal section through the upper portion of the two wings of the intermediate door in the joint area in enlarged scale; and FIG. 4: is a similar view as FIG. 1 showing, however, a modified conveyor system.

In FIG. 1 a smoke treatment chamber is generally shown at 10. It comprises an exterior load carrying frame structure 12 being formed from hollow section elements. An exterior housing 14 is connected to the frame structure 12. An isolating layer 16 is applied to the interior surface of the exterior housing 14, which in turn is covered by an interior housing 18 made from stainless steel.

The right hand end wall of the treatment chamber 10 as shown in FIG. 1 is formed with a doorway 20. As shown, the lower edge of the doorway 20 is located above a floor 22 of the treatment chamber 10, the lower portion of the chamber thus forming a trough. A drain schematically shown at 24 is provided for withdrawing liquid from this trough. A backfolded portion of the exterior housing 14 surrounding the doorway 20 forms a sealing edge 26 cooperating with an elastically deformable gasket 28 arranged on the periphery of a door wing 32 pivotally connected to the exterior housing 14. The door wing 32 cooperates with a similar door wing 30 (see FIG. 2) to sealingly close the doorway 20.

The top wall of the exterior housing 14 rigidly carries a rail section 36 by means of suspended trusses 34. One of the trusses 34 is arranged immediately adjacent to the doorway 20 and also serves for journalling a free running return roller 38 cooperating with a conveyor chain 40. A driven return roller for the conveyor chain 40 is provided in the left hand end portion of the treatment chamber 10, which is not shown in FIG. 1.

Product carriers generally designated by 42, which e.g. are formed like a shelf or are provided with hook means for the products to be processed, each are suspended from the rail section 36 by means of two spaced trolleys 44. The rail section 36 essentially has the form of a C-profile, the open side of which faces in downward direction, or has the form of a vertical rectangular or flat profile. Supporting rollers 46 and/or lateral guiding rollers 48 are provided for positively positioning and guiding the trolleys 44 within or on the rail.

For purposes of explanation a smoke generator, details of which are not shown in the drawings, is associated to the treatment chamber 10. Such smoke generator produces vapour smoke by forcing super heated water vapour of about 350°-400° C. through a bed of wood chips. The smoke is used for treating meat products and sausages carried by the product carriers 42, which have been moved into the treatment chamber, such that the colour, taste and consistency of the products are warranted.

In the right hand portion of FIG. 1 a cooling chamber is generally shown at 50. The cooling chamber 50 comprises a load taking frame structure 52 and an exterior housing 54. If desired, an isolating layer and an interior housing can be provided as in the case of the treatment chamber 10.

The top wall of the exterior housing 54 carries a rail section 58 by means of suspended trusses 56. The rail section 58 terminates under major clearance in front of the doorway 20. At the free end of the rail section 58 a pivot pin 60 is provided journalling one end of a pivotable rail section 62.

As may be seen from FIG. 1, the end of the rail portion 36 extends a small distance beyond the plane of the sealing edge 26 and is formed with a lower projecting support portion 64. The latter positively cooperates with a complementary support portion 66 arranged at the free end of the pivotable rail section 62.

In the vicinity of the free end of the rail section 62 there is provided a bearing block 68 projecting in upward direction and carrying a free running return roller 70 cooperating with a second conveying chain 72. The latter serves for moving the product carriers 42 through the cooling chamber 50 by means of controllable dogs not shown in the drawings.

The rail sections 36, 58 and 62 are of equal profile and in the conveying position of the pivotable rail section 62, which is shown in FIG. 1 by full lines, cooperate to form a continuous conveyor rail for the product carriers 42.

A double acting hydraulic actuator 76 is provided to move the rail section 62 from the conveying position into a park position shown in FIG. 1 by broken lines 74. The cylinder of the actuator 76 is pivotally connected to the exterior housing 54, its piston rod being pivotally connected to the bearing block 68.

The park position 74 has been shown in FIG. 1 in an exaggerated elevated position for better visibility. In reality the rail section 62 need be elevated only to an extent sufficient to allow movement of the door wing 32 below this rail section. The conveyor chain 72 can be operated in the park position, too, since two guide members 78, 80 being formed with convex working surfaces are arranged above the pivot pin 60 cooperating with the transport run and the return run of the conveyor chain 72, respectively.

In FIG. 1 the processing system for smoke treatment of meat products and sausages is shown in an operational state immediately before transfer of the product carrier 42 neighboring the exit of the treatment chamber 10 into the first position of the cooling chamber 50 shown in broken lines, from which a product carrier has been withdrawn before. Also before, the rail section 62 has been moved into the park position 74 and the two door wings 30 and 32 have been opened, whereupon the rail section 62 has been returned into the conveying position shown in full lines. By energizing the two conveyor chains 40 and 72 the product carrier 42 occupying the most right hand position of the treatment chamber 10 can now be moved from the rail section 36 and onto the rail section 62, such transfer being achieved without additional provisions, since the distance x defined between the two return rollers 38 and 70 is smaller than the distance y defined between the two trolleys 44 of a product carrier 42. If the trolleys 44 are formed such that they comprise only one support roller, the latter must be connected to a structure including a horizontal strut and two pins connected to the ends thereof thus allowing transfer of the product carrier 42 from one treatment chamber to another treatment chamber.

Transfer of the product carrier 42 to the cooling chamber 50 will also result in advancing the succeeding or last but one product carrier of treatment chamber 10 into the most right hand position of this treatment chamber. This product carrier can thereafter be transferred into the cooling chamber 50, immediately. However, if the products carried by this product carrier need further treatment in the treatment chamber 10, the drive associated to the conveyor chain 50 is de-energized.

After transfer of a desired number of product carriers 42 from the treatment chamber 10 into the cooling chamber 50 the actuator 76 is energized to move the rail section 62 into the park position 74 and the door wings 30 and 32 are closed. The rail section 62 will now remain in its park position until the door wings 30 and 32 are opened again for transfer of further product carriers. Even during this span of time product carriers can be withdrawn from the cooling chamber 50, since the conveyor chain 72 is operative also in the case of the rail section 62 having been moved into the park position 74, as has been explained above.

The treatment chamber 10 has a charging door which may be formed similar to the intermediate door separating the treatment chamber and the cooling chamber as shown in FIG. 1, a pivotable rail section being arranged upstream or in front of the charging door which is a mirror image of the arrangement shown in FIG. 1. This pivotable rail section provides a connection to a product carrier charging area of the entire production plant. Analogously the cooling chamber 50 at the downstream or exit end thereof is formed with a discharging door being similar to the intermediate door described above. A pivotable rail section is provided downstream of the discharging door which corresponds to the rail section shown in the center portion of FIG. 1 and establishes a connection to a product discharging area of the entire production plant. The product discharging area is connected to the charging or product filling area of the entire product plant by way of a product carrier return portion of the conveyor rail.

As may be seen from FIG. 2, the door wing 30 extends beyond the center plane of the doorway 20 by a distance corresponding at least to half of the breadth of the conveyor rail such that the door wing 30 completely overlies the rail section 36 in its closed position.

As may be seen from FIG. 3, the door wing 30 has an interior wall 82 and an exterior wall 84 as well as an intermediate isolating layer 86 made from foam material. In the vicinity of the rail section 36 the wall 82 of the door wing 30 is formed with a recess 88, the rail section 36 extending into the recess 88, when the door wing is closed.

As may also be seen from FIG. 3, the conveyor rail has an upper horizontal base wall 90 and legs 92, 94 formed integral therewith and extending in vertical downward direction. The legs 92, 94 carry lower horizontal support flanges 96, 98 cooperating to define a gap 100 allowing movement of the trolleys 44 therethrough.

An insert member of the conveyor rail made from plastics material and cooperating with the various rollers of the trolleys 44 is generally shown at 102. It comprises a base wall 104, legs 106, 108 as well as support flanges 110, 112, the latter overlying the support flanges 96, 98.

As has already been indicated, the conveyor rail may also be formed by a rectangular profile material being vertically oriented and forming a rail cooperating with trolley rollers, brackets being provided for connecting the product carriers 42 to these rollers.

The door wing 32 is a hollow sheet metal part filled with foamed material and is similar to the door wing 30. The periphery of the interior face of the two door wings is formed with a continuous channel forming recess 114, respectively, the portions of which opposing the sealing edge 26 each receiving the respective gasket 28. The vertical recess portion of the door wing 32 being adjacent to the center line of the door receives an abutment strip 116 the cross section of which is of L shape. The abutment strip 116 cooperates with an adjacent vertical portion 118 of the gasket 28 carried by the door wing 32 which is formed with a sealing surface 120 being sloped in outward direction.

As may be seen from FIG. 2, the door wings 30, 32 are pivotally connected to the exterior housing 14 of the treatment chamber 10 by means of hinges 122 and 124. At least one of the hinges 122, 124 has a rotatable hinge member being connected to a stub shaft 126 and 128, respectively, which in turn is rotated by a double acting cylinder 134 and 136, respectively, through crank arms 130, 132, respectively.

Further double acting cylinders 138, 140 are arranged on the door wing 32 on the upper and lower portion thereof, respectively. The cylinders 138, 140 serve for actuating latching bolts 142, 144, the free ends of which cooperate with latch catches 146, 148, respectively.

In the modified processing system shown in FIG. 4, system components already explained referring to FIG. 1 are again designated by the same reference numerals. These components need not be explained in detail below.

In accordance with FIG. 4 the rail portion 62 is of small longitudinal dimension and is directly connected to the end of the piston rod of the hydraulic actuator 76, which is now vertically oriented. The rail section 62 has a longitudinal dimension being just sufficient to allow passing of the door wing 30 through the conveyor rail arrangement. The bearing block 68 is arranged immediately adjacent to the upstream end of the rail section 58 and simultaneously serves for secure support of this rail end portion. The free end of the rail section 58 is formed with a support portion in a manner similar to the end portion of the rail section 36. This support portion supports the complementary shaped right hand end of the rail section 62. If the movable rail section 62 and the adjacent end portion of the rail section 58 are formed this way, the guide members 78, 80 are not required.

In the embodiments described above the treatment chamber was formed with a door opening in outward direction, respectively, and the movable rail section was arranged outside of the treatment chamber, correspondingly. Obviously, in the case of a treatment chamber being formed with a door opening in inward direction, the movable rail section is arranged in similar manner in the interior of the treatment chamber.

I claim:

1. A system for processing products, particularly food, comprising
   a) at least one leak-proof treatment chamber (10) including at least one doorway (20), a door (30, 32) and door hinge means (122, 124) allowing movement of the door (30, 32) between an open position giving access to the doorway and a closed position, wherein the door co-operates with the doorway in a fluid tight manner; and
   b) conveyor means (36–48, 58–72) extending through said doorway (20) and including
      ba) at least one conveyor rail (36, 58, 62) as well as
      bb) at least one product carrier (42) running on said conveyor rail (36, 58, 62),
      bc) said conveyor rail (36, 58, 62) having a first stationary rail section (36) inside the treatment chamber (10), a second stationary rail section (58) arranged outside of the treatment chamber (10) at a distance from the doorway (20) and an intermediate rail section (62) movable between a conveying position, wherein it is aligned with the stationary rail sections (36, 58) of the conveyor rail (36, 58, 62), and a park position (74), wherein the door (30, 32) can be moved through an area occupied by the conveyor rail, the longitudinal dimension of the movable rail section (62) corresponding to the length of the interpenetration area of the path of the door (30, 32) and of the conveyor rail (36, 58, 62), characterized in that c) the movable rail section (62) is mounted for shifting movement in a vertical direction and
d) first return means (38) associated with a first flexible conveyor means (40) extending through the treatment chamber (10) and arranged in the immediate vicinity of the interior side of the doorway (20), and
e) second return means (70) associated with a second flexible conveying means (72) mounted at the exterior side of the doorway (20) and positioned on the respective stationary rail section (58) at a location adjacent to said end portion thereof neighboring the doorway (20).

2. The system as set forth in claim 1, wherein the distance (x) defined between the first return means (38) and the second return means (70) is smaller than the distance (y) defined between two driven carrying members (44, 48) arranged at opposing ends of the product carrier (42) and running on the conveyor rail (36, 58, 62).

3. A system for processing products, particularly food, comprising
a) at least one leak proof treatment chamber (10) including at least one doorway (20), a door (30, 32) and door hinge means (122, 124) allowing movement of the door (30, 32) between an open position giving access to the doorway and a closed position, wherein the door co-operates with the doorway in a fluid tight manner; and
b) conveyor means (36–48, 58–72) extending through said doorway (20) and including
ba) at least one conveyor rail (36, 58, 62) as well as
bb) at least one product carrier (42) running on said conveyor rail (36, 58, 62),
bc) the conveyor rail (36, 58, 62) having a first stationary rail section (36) inside the treatment chamber (10), a second stationary rail section (58) arranged outside of the treatment chamber (10) at a distance from the doorway (20) and an intermediate rail section (62) movable between a conveying position, wherein it is aligned with the stationary rail sections (36, 58) of the conveyor rail (36, 58, 62), and a park position (74), wherein the door (30, 32) can be moved through an area occupied by the conveyor rail, the longitudinal dimension of the movable rail section (62) corresponding to the length of the interpenetration area of the path of the door (30, 32) and of the conveyor rail (36, 58, 62),
characterized in that
c) the movable rail section (62) is pivotally connected to the second stationary rail section (58) being located outside of the doorway (20),
d) first return means (38) associated with a first flexible conveying means (40) extending through the treatment chamber (10) and provided in the immediate vicinity of the interior side of the doorway (20),
e) second return means (70) associated with a second flexible conveying means (72) mounted outside of the doorway (20) and positioned on the pivotable rail section (62) at a location thereof immediately adjacent to its free end, and
f) guide members (78, 80) which are adapted to cooperate with an operating run and a return run of the second flexible conveying means (72), respectively.

4. The system in accordance with claim 3, wherein the two guide members (68, 80) are positioned at the pivot point (60) of the pivotal rail section (62) with respect to conveying direction.

5. The system set forth in claim 3, wherein an end portion of the first stationary rail section (36) is supported at a location immediately adjacent to the inner side of the doorway (20) and is formed with a support portion (64) projecting through the doorway (20) and cooperating with a complementary shaped support portion (66) of the movable rail section (62).

6. The system as set forth in claim 5, wherein the support portion (64) is of a longitudinal dimension smaller than the thickness of the door (30, 32) and the interior face of the door (30, 32) is formed with a recess (88) which is adapted to receive the support portion (64), when the door (30, 32) is closed.

7. The system as set forth in claim 6, wherein the door (30, 32) comprises two door wings (30, 32) of different breadth and in that the recess (88) is completely formed in one (32) of the door wings (30, 32).

8. The system as set forth in claim 3, wherein the distance (x) defined between the first return means (38) and the second return means (70) is smaller than the distance (y) defined between two driven carrying members (44, 48) arranged at opposing ends of the product carrier (42) and running on the conveyor rail (36, 58, 62).

* * * * *